United States Patent
Tateoka et al.

(10) Patent No.: US 12,489,608 B2
(45) Date of Patent: Dec. 2, 2025

(54) CRYPTOGRAPHY COMMUNICATION SYSTEM, KEY EXCHANGE NODE, APPLICATION EXECUTION ENVIRONMENT, CONTROL METHOD, AND STORAGE MEDIUM

(71) Applicants: Kabushiki Kaisha Toshiba, Tokyo (JP); Toshiba Digital Solutions Corporation, Kawasaki (JP)

(72) Inventors: Masamichi Tateoka, Tokyo (JP); Masanori Tomoda, Tokyo (JP); Tomoyuki Tanaka, Tokyo (JP); Kazutoyo Nakamura, Tokyo (JP)

(73) Assignees: Kabushiki Kaisha Toshiba, Kawasaki (JP); Toshiba Digital Solutions Corporation, Kawasaki (JP)

( * ) Notice: Subject to any disclaimer, the term of this patent is extended or adjusted under 35 U.S.C. 154(b) by 231 days.

(21) Appl. No.: 18/182,132

(22) Filed: Mar. 10, 2023

(65) Prior Publication Data

US 2023/0208623 A1 Jun. 29, 2023

Related U.S. Application Data

(63) Continuation of application No. PCT/JP2021/026830, filed on Jul. 16, 2021.

(30) Foreign Application Priority Data

Sep. 10, 2020 (JP) .................. 2020-151990

(51) Int. Cl.
*H04L 9/08* (2006.01)
(52) U.S. Cl.
CPC ............ *H04L 9/0825* (2013.01); *H04L 9/085* (2013.01); *H04L 9/0861* (2013.01)

(58) Field of Classification Search
CPC ...... H04L 9/0825; H04L 9/085; H04L 9/0861
See application file for complete search history.

(56) References Cited

U.S. PATENT DOCUMENTS

2012/0281837 A1* 11/2012 Arnold .................... H04L 9/088
380/277
2013/0138961 A1 5/2013 Tsuji et al.
(Continued)

FOREIGN PATENT DOCUMENTS

JP 2011044768 A * 3/2011 ............... G09C 5/00
JP 2013-122410 A 6/2013
(Continued)

OTHER PUBLICATIONS

Int'l Telecommunication Union, "ITU-T—Telecommunication Standardization Sector of ITU, Y.3800, Series Y: Global Information Infrastructure, Internet Protocol Aspects, Next Generation Networks, Internet of Things and Smart Cities, Cloud Computing, Overview on networks supporting quantum key distribution. Recommendation ITU-T Y.3800," 22 pages (2019).

(Continued)

*Primary Examiner* — Darshan I Dhruv
(74) *Attorney, Agent, or Firm* — Finnegan, Henderson, Farabow, Garrett & Dunner, LLP

(57) ABSTRACT

According to one embodiment, an encryption/decryption execution environment encrypts and decrypts data of an application program while consuming an encryption key unit. A key exchange node accumulates an encryption key shared with a communication counterpart. A key accumulation amount monitoring function unit included in a key exchange node monitors an accumulation amount of the encryption key. A key accumulation amount notification function unit included in an application execution environment notifies a user of the application program or the (Continued)

application program of an accumulation amount of the encryption key acquired by the key accumulation amount monitoring function unit.

13 Claims, 6 Drawing Sheets

(56) References Cited

U.S. PATENT DOCUMENTS

| | | |
|---|---|---|
| 2014/0365774 A1 | 12/2014 | Tanizawa et al. |
| 2017/0222803 A1* | 8/2017 | Tanizawa ............. H04L 63/0853 |
| 2017/0230173 A1* | 8/2017 | Choi ..................... H04L 9/0861 |
| 2017/0264433 A1* | 9/2017 | Tanizawa .............. H04L 9/0858 |
| 2018/0054306 A1* | 2/2018 | Tanizawa .............. H04L 9/0819 |
| 2019/0074961 A1* | 3/2019 | Tanizawa ................. H04L 9/32 |

FOREIGN PATENT DOCUMENTS

| | | |
|---|---|---|
| JP | 2014-241464 A | 12/2014 |
| WO | WO 2012/025987 A1 | 3/2012 |
| WO | WO 2016/147340 A1 | 9/2016 |

OTHER PUBLICATIONS

European Patent Office, Extended European Search Report in EP App. No. 21866370.6, 8 pages (Sep. 11, 2024).

* cited by examiner

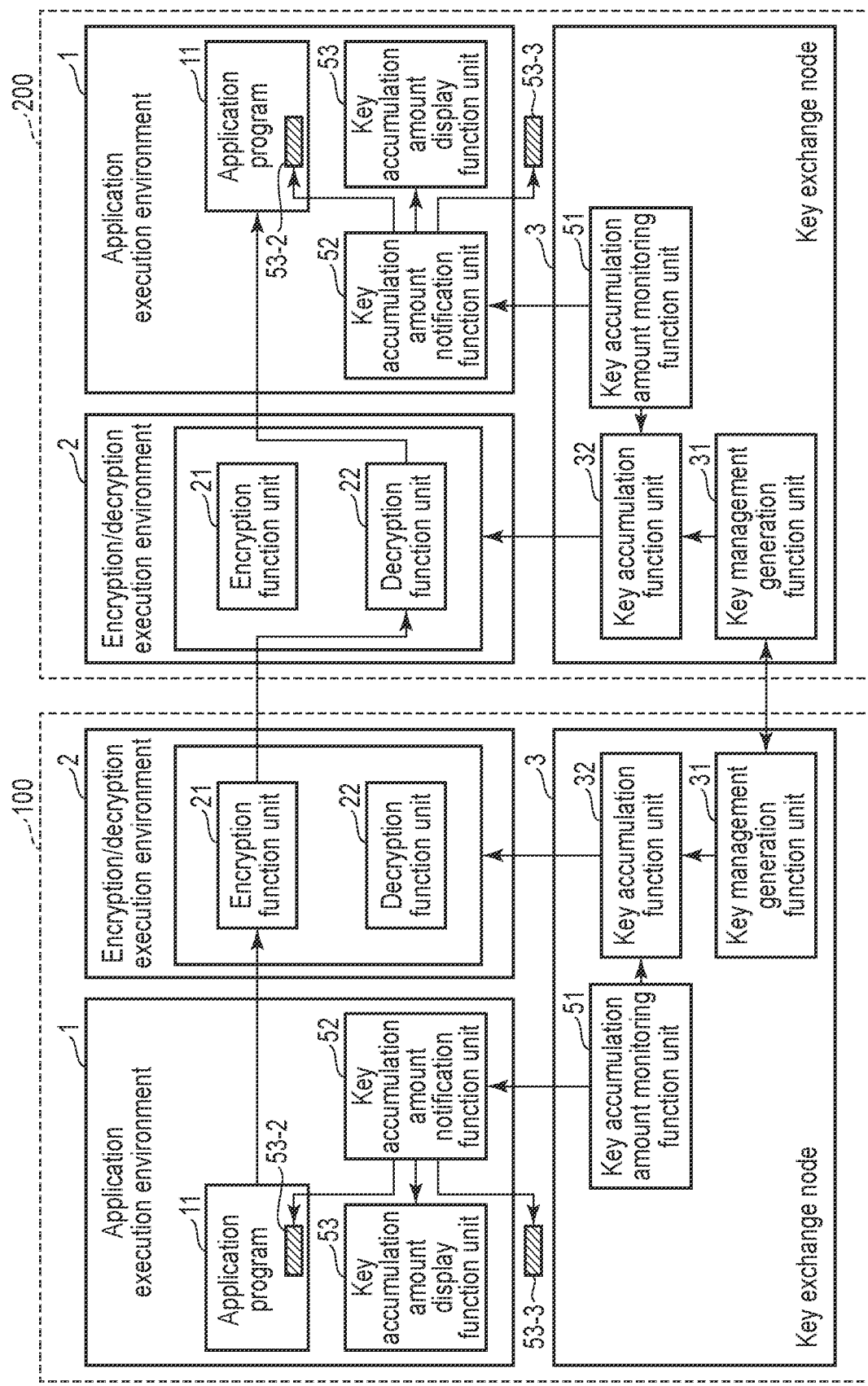
F I G. 1

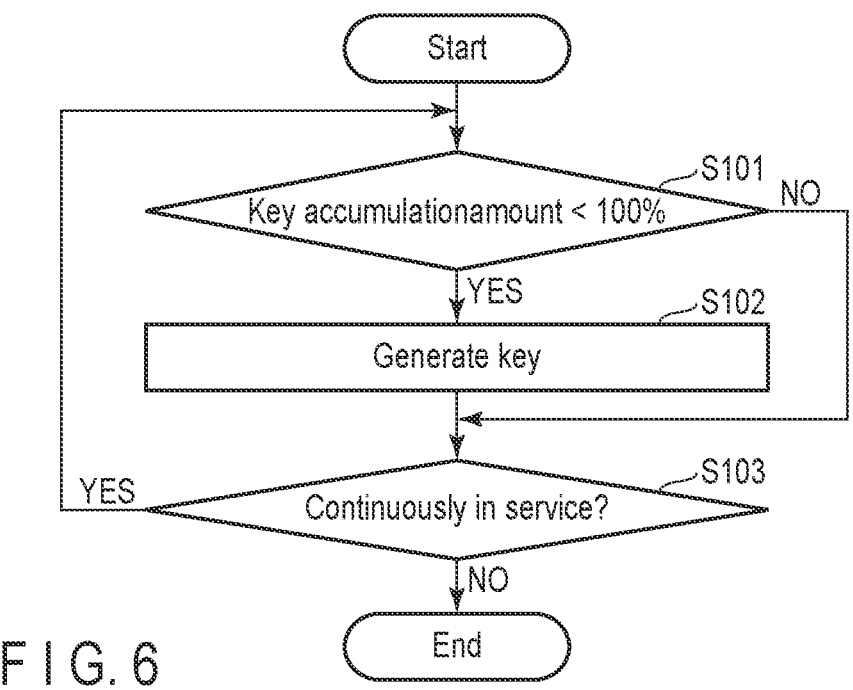
F I G. 6
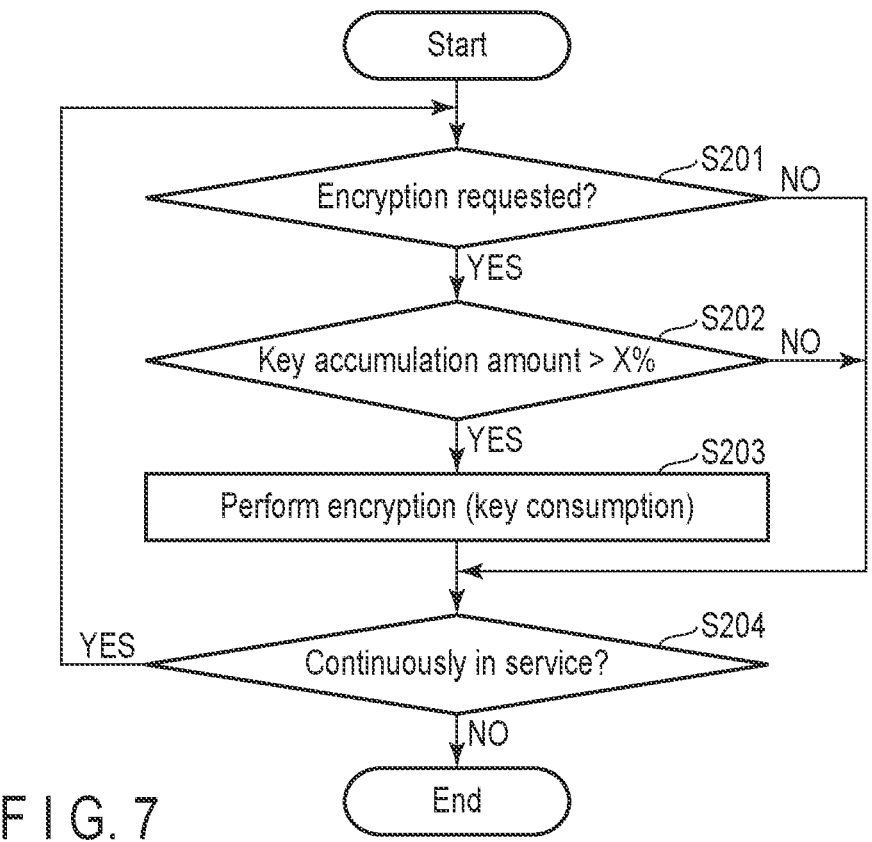
F I G. 7

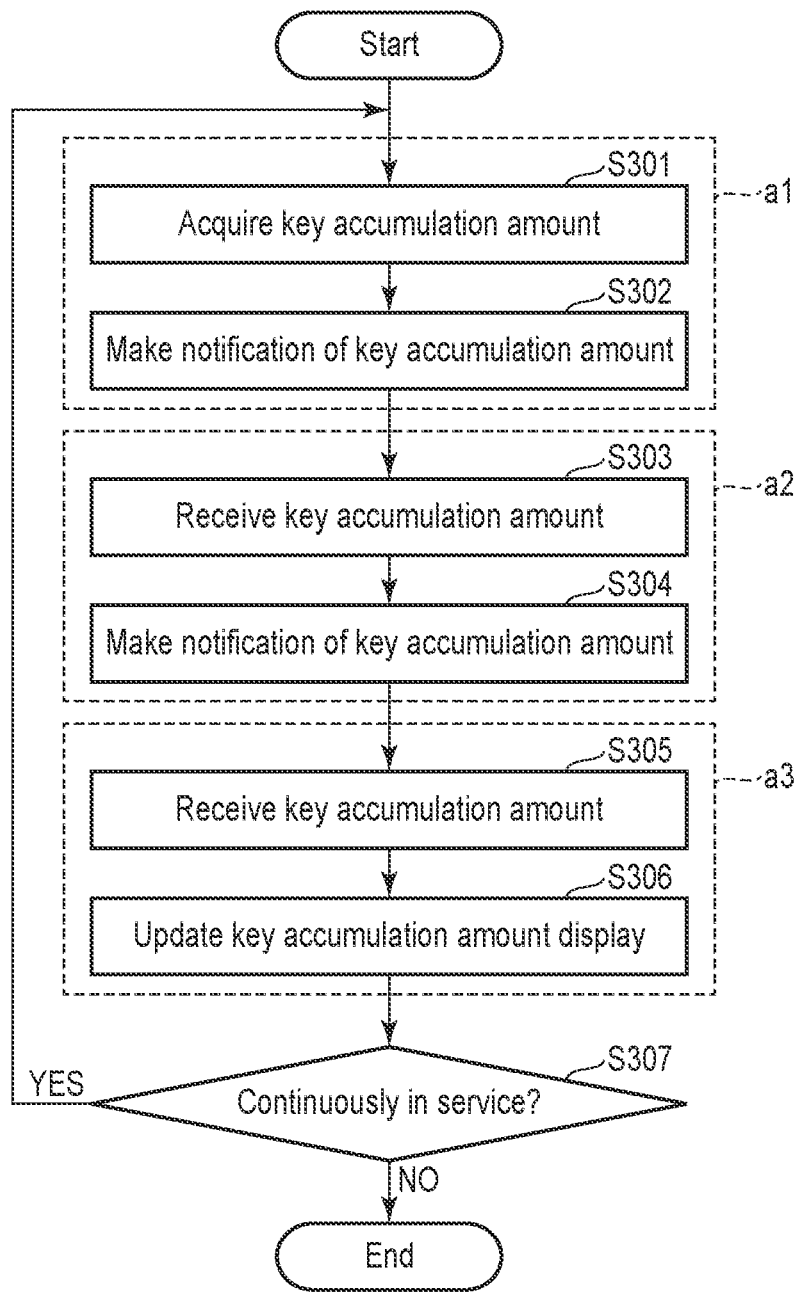
F I G. 8

CRYPTOGRAPHY COMMUNICATION SYSTEM, KEY EXCHANGE NODE, APPLICATION EXECUTION ENVIRONMENT, CONTROL METHOD, AND STORAGE MEDIUM

CROSS-REFERENCE TO RELATED APPLICATIONS

This application is a Continuation Application of PCT Application No. PCT/JP2021/026830, filed Jul. 16, 2021 and based upon and claiming the benefit of priority from Japanese Patent Application No. 2020-151990, filed Sep. 10, 2020, the entire contents of all of which are incorporated herein by reference.

FIELD

Embodiments described herein relate generally to a cryptography communication system, a key exchange node, an application execution environment, a control method, and a storage medium.

BACKGROUND

In recent years, various cryptography communication systems have been used for security protection of data transmitted and received via a network. As one of them, there is a cryptography communication system using a key exchange node having a function of generating an encryption key used for encrypting data. The key exchange node shares the generated encryption key with the key exchange node of the communication counterpart, and accumulates the encryption key shared with the key exchange node of the communication counterpart. The key exchange node may transmit the encryption key generated by itself to the key exchange node of the communication counterpart while receiving the encryption key generated by the key exchange node of the communication counterpart from the key exchange node of the communication counterpart (key exchange).

The cryptography communication device applied in the cryptography communication system encrypts transmission data of various application programs using the encryption key accumulated in the key exchange node. Also in the decryption of the encrypted reception data, the cryptography communication device uses the encryption key accumulated in the key exchange node.

There are several encryption methods used in the cryptography communication device. For the cryptography communication device, in a case where a one-time pad (OTP) method or the like in which a random number having a length same as that of the communication amount is used and a random number once used is not reused is used, when a situation in which the consumption amount of the encryption key exceeds the supply amount continues, there is a possibility that the encryption key will be depleted. That is, although the cryptography communication system using the key exchange node has a function of generating an encryption key, it can also be understood as a system having the finite encryption key under a specific situation. Even in quantum cryptography that has recently attracted attention, since an encryption key generated by quantum key distribution is used, the encryption key is finite when the consumption amount of the encryption key exceeds the supply amount.

It is preferable that a user who uses a cryptography communication system with a finite encryption key can predict depletion of the encryption key, and check the accumulation amount of the encryption key as needed in order to determine how long current communication can be continued and give priority to communication contents (transmission source, destination, protocol, etc.). However, a mechanism for notifying the user of the accumulation amount of the encryption key has not been realized so far.

BRIEF DESCRIPTION OF THE DRAWINGS

FIG. 1 is a diagram illustrating an example of a configuration of a cryptography communication system according to the first embodiment.

FIG. 6 is a flowchart illustrating a procedure of generating the encryption key in the cryptography communication system according to the first embodiment.

FIG. 7 is a flowchart illustrating an encryption procedure in the cryptography communication system according to the first embodiment.

FIG. 8 is a flowchart illustrating a procedure of a notification of the accumulation amount of the encryption key in the cryptography communication system according to the first embodiment.

DETAILED DESCRIPTION

Figure 2:
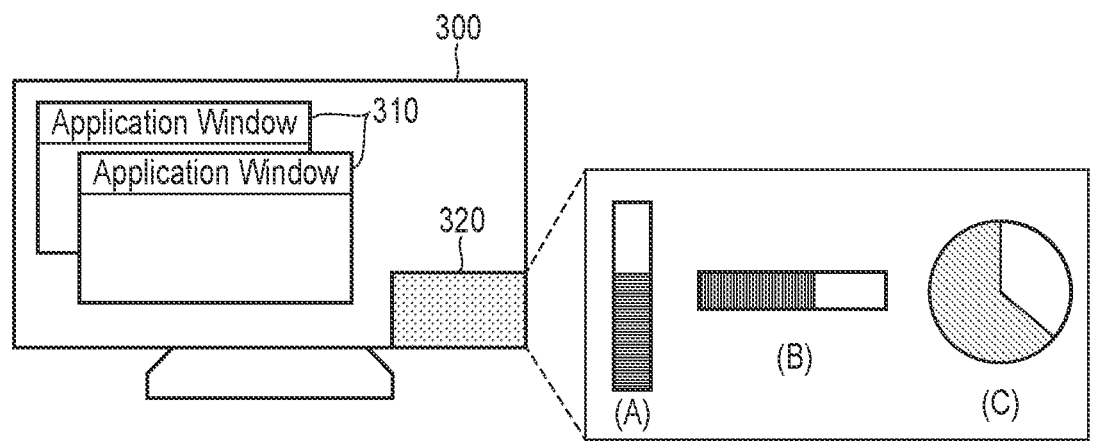
FIG. 2 is a diagram illustrating an example of an accumulation amount of an encryption key by the cryptography communication system according to the first embodiment.

Embodiments will be described hereinafter with reference to the accompanying drawings.

In general, according to one embodiment, a cryptography communication system includes an application execution environment, an encryption/decryption execution environment, and a key exchange node. In the application execution environment, an application program that transmits and receives data via a network operates. The encryption/decryption execution environment encrypts transmission data of the application program and decrypts encrypted reception data of the application program while consuming an encryption key for each predetermined processing unit. The key exchange node generates the encryption key, shares the generated encryption key with a communication counterpart, and accumulates an encryption key shared with the communication counterpart. The key exchange node includes a key accumulation amount monitoring function unit. The key accumulation amount monitoring function unit monitors an accumulation amount of the encryption key. The application execution environment includes a key accumulation amount notification function unit. The key accumulation amount notification function unit notifies a user of the application program or the application program of an accumulation amount of the encryption key acquired by the key accumulation amount monitoring function unit.

First Embodiment

The first embodiment will be described.

FIG. 1 is a diagram illustrating an example of a configuration of a cryptography communication system according to the first embodiment.

The cryptography communication system according to the present exemplary embodiment includes an application execution environment 1, an encryption/decryption execution environment 2, and a key exchange node 3.

The application execution environment 1 is an environment in which an application program 11 that transmits and receives data via a network operates, and is an information processing device such as a server or a personal computer. Although only one application program 11 is illustrated in the application execution environment 1 in FIG. 1, there may be a plurality of application programs 11 that transmit and receive data via the network in the application execution environment 1.

The encryption/decryption execution environment 2 encrypts the transmission data of the application program 11 operating in the application execution environment 1, and decrypts the encrypted reception data of the application program 11. The encryption/decryption execution environment 2 may be realized in software by a program or may be realized in hardware by an electronic circuit or the like. In a case where the encryption/decryption execution environment 2 is realized in software, the encryption/decryption execution environment 2 can be constructed on the information processing device in which the application execution environment 1 is constructed. From the viewpoint of preventing leakage of the encryption key, the encryption/decryption execution environment 2 is preferably constructed on a different information processing device so as to be not only logically separated from but also physically separated from the application execution environment 1. The encryption/decryption execution environment 2 includes an encryption function unit 21 and a decryption function unit 22.

The key exchange node 3 generates an encryption key used for encryption executed in the encryption/decryption execution environment 2, shares the generated encryption key with the key exchange node 3 of the communication counterpart, and accumulates the encryption key shared with the key exchange node 3 of the communication counterpart. While transmitting the encryption key generated by the key exchange node 3 to the key exchange node 3 of the communication counterpart, the key exchange node 3 may receive an encryption key generated by the key exchange node 3 of the communication counterpart from the key exchange node 3 of the communication counterpart (key exchange). The key exchange node 3 may be realized in software by a program or may be realized in hardware by an electronic circuit or the like. In a case where the key exchange node 3 is realized in software, the key exchange node 3 can be constructed on the information processing device in which the application execution environment 1 and the encryption/decryption execution environment 2 are constructed. From the viewpoint of preventing leakage of the encryption key, the key exchange node 3 is preferably constructed on a different information processing device so as to be not only logically separated from but also physically separated from at least the application execution environment 1. The key exchange node 3 includes a key generation management function unit 31 and a key accumulation function unit 32.

First, a basic operation of the encryption system in a case where data is transmitted from a certain application program 11 to another application program 11 via a network will be described.

The transmission data output from the application program 11 operating in the transmission side (surrounded by the dashed rectangle 100) application execution environment 1 to the reception side (surrounded by the dashed rectangle 200) application program 11 operating in the application execution environment 1 is transferred to the transmission side encryption/decryption execution environment 2, and is encrypted by the encryption function unit 21 of the encryption/decryption execution environment 2.

The encryption function unit 21 encrypts the transmission data using the encryption key accumulated in the key accumulation function unit 32 of the key exchange node 3. The encryption function unit 21 uses, for example, a one-time pad (OTP) method or the like in which a random number having a length same as that of the communication amount is used and a random number once used is not reused, and executes encryption of transmission data. That is, the encryption function unit 21 consumes the encryption key accumulated in the key accumulation function unit 32 for each predetermined processing unit.

The encryption key used for encryption by the encryption function unit 21 is generated by the key generation management function unit 31. When the accumulation amount of the encryption key of the key accumulation function unit 32 is not the full amount (100%), the key generation management function unit 31 generates the encryption key. A method of generating the encryption key is not limited to a specific method, and various methods may be applied.

The key accumulation function unit 32 of the key exchange node 3 also accumulates an encryption key used for decryption by the decryption function unit 22 of the encryption/decryption execution environment 2. The data to be decrypted by the decryption function unit 22 is data (reception data) transmitted from the communication counterpart in an encrypted state. This encryption key is an encryption key generated by the key generation management function unit 31 of the key exchange node 3 of the communication counterpart. The key generation management function unit 31 accumulates the encryption key (an encryption key for encryption and an encryption key for decryption) shared with the communication counterpart in the key accumulation function unit 32.

The transmission data encrypted by the encryption function unit 21 is transferred to the reception side encryption/decryption execution environment 2 via the network. Note that, on the reception side, this transmission data is treated as reception data. The encrypted reception data is decrypted by the decryption function unit 22 of the encryption/decryption execution environment 2. The encryption key for decrypting the reception data is received by the key generation management function unit 31 from the key generation management function unit 31 of the communication counterpart and accumulated in the key accumulation function unit 32. The decryption function unit 22 decrypts the encrypted reception data using the encryption key accumulated in the key accumulation function unit 32. The reception data decrypted by the decryption function unit 22 is transferred to the application program 11 operating in the reception side application execution environment 1.

As described above, the data transmitted and received between the application program 11 operating in the transmission side application execution environment 1 and the application program 11 operating in the reception side application execution environment 1 is encrypted with the encryption key shared between the transmission side key exchange node 3 and the reception side key exchange node 3 between the transmission side encryption/decryption execution environment 2 and the reception side encryption/decryption execution environment 2, that is, on the network, so that confidentiality of the data is secured.

Note that the application program 11 operating in the application execution environment 1 can transmit and receive data with a plurality of application programs 11 operating in different application execution environments 1 as communication counterparts. In addition, the plurality of application programs 11 operating in the application execution environment 1 can transmit and receive data with the application programs 11 operating in a different application execution environment 1 as a communication counterpart. Therefore, the encryption/decryption execution environment 2 is not limited to transmitting and receiving data to and from the encryption/decryption execution environment 2 of the communication counterpart on a one-to-one basis, and can transmit and receive data to and from the encryption/decryption execution environment 2 of the communication counterpart on a one-to-many basis.

For example, when the transmission data amount of one or more application programs 11 operating in the application execution environment 1 rapidly increases, the consumption amount of the encryption key by the encryption function unit 21 of the encryption/decryption execution environment 2 rapidly increases accordingly. When the consumption amount exceeds the supply amount of the encryption key, to the key accumulation function unit 32, generated by the key generation management function unit 31 of the key exchange node 3, the accumulation amount of the encryption key of the key accumulation function unit 32 decreases. When the consumption amount of the encryption key exceeds the supply amount for a long time, a situation in which the encryption key is depleted may occur.

When the depletion of the encryption key can be predicted, the user can determine how long the current communication can be continued, and can take measures such as giving priority to communication contents (transmission source, destination, protocol, etc.). For example, it is possible to take measures such as giving priority (transmission source) to transmission of data such as the application program 11 for an online conference, which is required to be transferred in real time, such as video and audio of the online conference, over transmission of data such as the application program 11 for e-mail, which is allowed to be delayed to some extent, such as an e-mail. For example, measures such as stopping the application program 11 for e-mail until the online conference ends can be taken.

Alternatively, in order to prevent data transmission to a certain communication counterpart from being stopped due to depletion of the encryption key, it is also possible to take measures such as refraining from transmitting data to other communication counterparts (destination). Furthermore, for example, it is also possible to take measures such as continuing only transmission of audio and stopping transmission of video for video and audio of an online conference (protocol).

As described above, when the depletion of the encryption key can be predicted, the user can select communication to be prioritized.

Therefore, in the cryptography communication system according to the present embodiment, it is possible to, for example, predict depletion of an encryption key and notify a user of an accumulation amount of an encryption key in order to provide priority regarding allocation of the encryption key for each communication content (transmission source, destination, protocol, etc.) in a case where depletion of the encryption key is predicted. Hereinafter, this point will be described in detail.

As illustrated in FIG. 1, in the cryptography communication system according to the present embodiment, the key exchange node 3 further includes a key accumulation amount monitoring function unit 51, and the application execution environment 1 further includes a key accumulation amount notification function unit 52 and a key accumulation amount display function unit 53. Note that, here, an example is illustrated in which the key accumulation amount display function unit 53 is implemented as an independent program specialized in the display function and operating in the application execution environment 1, but the key accumulation amount display function unit 53 can be implemented as a function unit of the application program 11 operating in the application execution environment 1 (53-2) or can be implemented as a dedicated display device or the like (53-3).

The key accumulation amount monitoring function unit 51 of the key exchange node 3 monitors the accumulation amount of the encryption key of the key accumulation function unit 32. The key accumulation amount monitoring function unit 51 notifies the key accumulation amount notification function unit 52 of the application execution environment 1 of the accumulation amount of the encryption key obtained by monitoring, for example, at regular intervals or when the accumulation amount changes. Alternatively, the key accumulation amount notification function unit 52 of the application execution environment 1 may acquire the accumulation amount of the encryption key from the key accumulation amount monitoring function unit 51 of the key exchange node 3 at regular intervals, for example. That is, in the cryptography communication system according to the present embodiment, the application execution environment 1 (key accumulation amount notification function unit 52) and the key exchange node 3 (key accumulation amount monitoring function unit 51) cooperate with each other.

When acquiring the accumulation amount of the encryption key of the key accumulation function unit 32 from the key accumulation amount monitoring function unit 51 of the key exchange node 3, the key accumulation amount notification function unit 52 of the application execution environment 1 notifies the key accumulation amount display function unit 53 of the accumulation amount of the encryption key. The key accumulation amount display function unit 53 that has received the notification presents the notified accumulation amount of the encryption key to the user via, for example, a display device for a GUI included in an information processing device in which the application execution environment 1 is constructed. The key accumulation amount display function unit 53 displays the accumulation amount of the encryption key on the display screen of the display device in a display format that allows the user to intuitively understand the accumulation amount of the encryption key.

FIG. 2 is a diagram illustrating an example of a display of the accumulation amount of the encryption key of the key accumulation function unit 32 of the key exchange node 3 by the key accumulation amount display function unit 53.

As illustrated in FIG. 2, the key accumulation amount display function unit 53 displays a window 320 for displaying the accumulation amount of the encryption key on, for example, a display screen 300 of a display device for a GUI included in the information processing device in which the application execution environment 1 is constructed, that is, the display screen 300 on which a window 310 of the application program 11 operating in the application execution environment 1 is displayed. The key accumulation amount display function unit 53 graphically displays the accumulation amount of the encryption key at that time in the window 320, for example, as a graph (A) represented by a vertical bar, a graph (B) represented by a horizontal bar, a graph (C) represented by a circle, or the like. According to this graph, the user can grasp the usage rate of the encryption key at that time. When the usage rate represented by this graph is rapidly decreasing, the user can predict the depletion of the encryption key and take various measures as described above.

Figure 3:
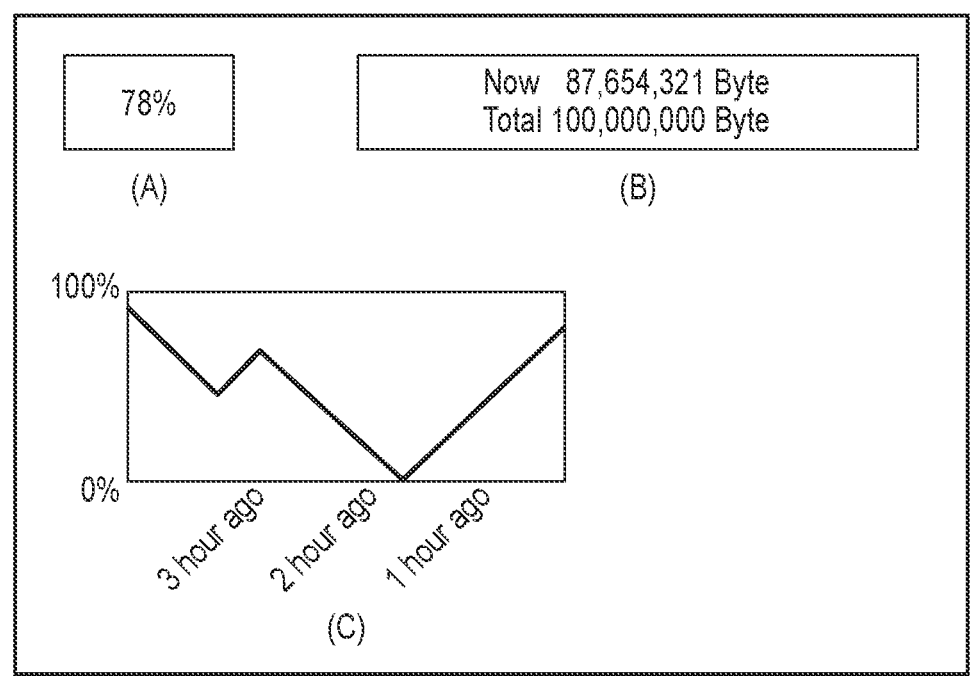
FIG. 3 is a diagram illustrating another example of display of the accumulation amount of the encryption key by the cryptography communication system according to the first embodiment.

In addition, the key accumulation amount display function unit 53 can not only graphically displaying the accumulation amount of the encryption key, but also display the accumulation amount of the encryption key in various display formats. FIG. 3 illustrates another display example of the accumulation amount of the encryption key.

(A) of FIG. 3 is an example in which the usage rate of the encryption key is displayed as a numerical value. (B) of FIG. 3 is an example in which the accumulation amount (data amount: Now) of the encryption key at that time and the total amount (data amount: Total) of the encryption key that can be accumulated by the key accumulation function unit 32 are displayed side by side as numerical values. (C) of FIG. 3 is an example of displaying a line graph in which the accumulation amount of the encryption key is plotted at a constant cycle. In addition, the key accumulation amount display function unit 53 may adopt a display format in combination thereof in which a bar graph illustrated in (A) of FIG. 2 and a line graph illustrated in (C) of FIG. 3 are combined and displayed, for example.

Figure 4:
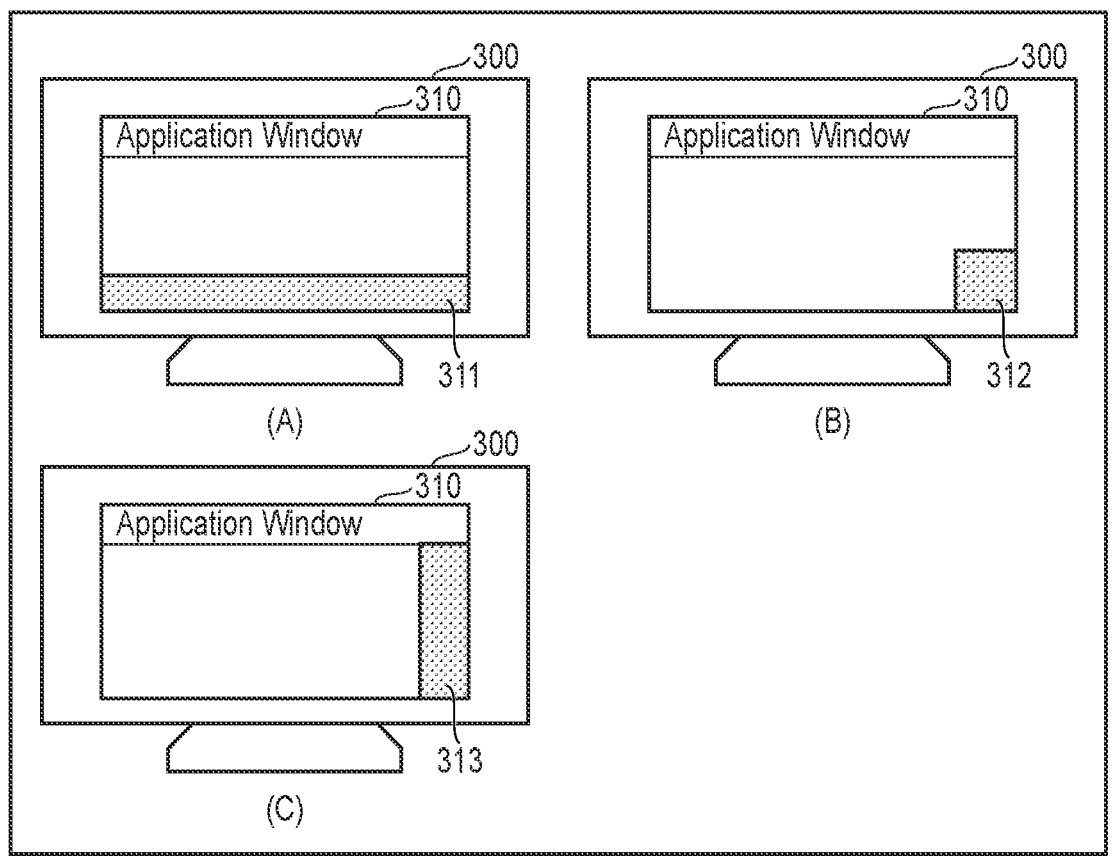
FIG. 4 is a diagram illustrating a modification of a method of displaying the accumulation amount of the encryption key by the cryptography communication system according to the first embodiment.

FIG. 4 is a diagram illustrating an example of a display of the accumulation amount of the encryption key in a case where the key accumulation amount display function unit 53 is implemented as a function unit of the application program 11 operating in the application execution environment 1 (FIG. 1: 53-2).

In this case, the accumulation amount of the encryption key is displayed in the window 310 displayed by the application program 11 including the key accumulation amount display function unit 53 as a function unit in the display form illustrated in FIGS. 2 and 3, for example. (A) of FIG. 4 illustrates an example in which a display area 311 of the accumulation amount of the encryption key is provided on the lower side portion of the window 310. (B) of FIG. 4 illustrates an example in which a display area 312 of the accumulation amount of the encryption key is provided in the lower right portion of the window 310. (C) of FIG. 4 illustrates an example in which the display area 312 of the accumulation amount of the encryption key is provided on the right side portion of the window 310. The user may appropriately select one of the display areas 311 to 313.

Figure 5:
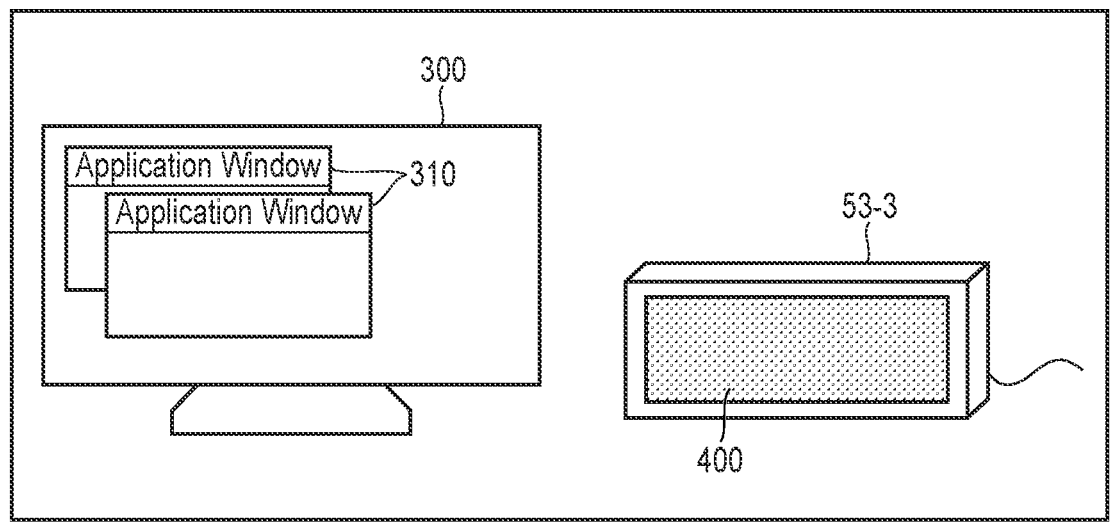
FIG. 5 is a diagram illustrating another modification of the method of displaying the accumulation amount of the encryption key by the cryptography communication system of the first embodiment.

FIG. 5 is a diagram illustrating an example of a display of the accumulation amount of the encryption key in a case where the key accumulation amount display function unit 53 is implemented as a display dedicated device or the like (FIG. 1: 53-3).

In this case, for example, the accumulation amount of the encryption key is displayed on a display screen 400 of the key accumulation amount display function unit 53 (53-3) implemented as a display dedicated device or the like disposed in the vicinity of the display screen 300 on which the window 310 of the application program 11 operating in the application execution environment 1 is displayed in the display form illustrated in FIGS. 2 and 3.

As described above, the key accumulation amount display function unit 53 may be implemented as an independent program specialized in the display function and operating in the application execution environment 1, may be implemented as a function unit of the application program 11 operating in the application execution environment 1, or may be implemented as a dedicated display device or the like.

FIG. 6 is a flowchart illustrating a procedure of generating an encryption key in the cryptography communication system according to the present exemplary embodiment.

The key generation management function unit 31 of the key exchange node 3 determines whether the accumulation amount of the encryption key of the key accumulation function unit 32 of the key exchange node 3 is the full amount (100%) (S101). In a case where it is not the full amount (S101: YES), the key generation management function unit 31 generates an encryption key (S102). The encryption key generated by the key generation management function unit 31 is accumulated in the key accumulation function unit 32. In a case where it is the full amount (S101: NO), the key generation management function unit 31 skips S102.

When the cryptography communication system is continuously in service (S103: YES), the key generation management function unit 31 repeats the processing from S101. When the cryptography communication system stops the service (S103: NO), the key generation management function unit 31 ends the generation of the encryption key.

FIG. 7 is a flowchart illustrating an encryption procedure in the cryptography communication system according to the present exemplary embodiment.

The encryption function unit 21 of the encryption/decryption execution environment 2 determines the presence or absence of an encryption request (S201). When the encryption request has been received (S201: YES), the encryption function unit 21 determines whether the accumulation amount of the encryption key of the key accumulation function unit 32 of the key exchange node 3 exceeds a threshold value (X %) (S202). The threshold value is determined based on, for example, a statistical value of a capacity of data transmitted via a network.

When it exceeds the threshold value (S202: YES), the encryption function unit 21 uses the encryption key accumulated by the key accumulation function unit 32, that is, consumes the encryption key, and executes the requested encryption (S203).

On the other hand, when the accumulation amount of the encryption key is equal to or less than the threshold value (S202: NO), the encryption function unit 21 returns an error to the encryption request and skips S203. When the encryption request is not received (S201: NO), the encryption function unit 21 skips S202 to S203.

When the cryptography communication system is continuously in service (S204: YES), the encryption function unit 21 repeats the processing from S201. When the cryptography communication system stops the service (S204: NO), the key generation management function unit 31 ends the encryption.

FIG. 8 is a flowchart illustrating a procedure of a notification of the accumulation amount of the encryption key in the cryptography communication system according to the present exemplary embodiment.

The notification of the accumulation amount of the encryption key in the cryptography communication system according to the present embodiment is roughly divided into three steps of a process (a1) by the key accumulation amount monitoring function unit 51 of the key exchange node 3, a process (a2) by the key accumulation amount notification function unit 52 of the application execution environment 1, and a process (a3) by the key accumulation amount display function unit 53 of the application execution environment 1.

First, the key accumulation amount monitoring function unit 51 of the key exchange node 3 acquires the accumulation amount of the encryption key of the key accumulation function unit 32 of the key exchange node 3 (S301). The key accumulation amount monitoring function unit 51 notifies the key accumulation amount notification function unit 52 of the application execution environment 1 of the acquired accumulation amount of the encryption key (S302).

The key accumulation amount notification function unit 52 receives the accumulation amount of the encryption key from the key accumulation amount monitoring function unit 51 (S303), and notifies the key accumulation amount display function unit 53 of the application execution environment 1 of the received accumulation amount of the encryption key (S304).

The key accumulation amount display function unit 53 receives the accumulation amount of the encryption key from the key accumulation amount notification function unit 52 (S305), and updates the accumulation amount of the encryption key, for example, graphically displayed based on the received accumulation amount of the encryption key (S306).

When the cryptography communication system is continuously in service (S307: YES), the processes of the key accumulation amount monitoring function unit 51, the key accumulation amount notification function unit 52, and the key accumulation amount display function unit 53 from S301 are repeated. When the cryptography communication system stops the service (S307: NO), the notification of the accumulation amount of the encryption key by the key accumulation amount monitoring function unit 51, the key accumulation amount notification function unit 52, and the key accumulation amount display function unit 53 ends.

The exchange of the accumulation amount of the encryption key between the key accumulation amount monitoring function unit 51 and the key accumulation amount notification function unit 52 may be that the key accumulation amount notification function unit 52 acquires the amount from the key accumulation amount monitoring function unit 51 at regular intervals, for example.

As described above, the cryptography communication system according to the present exemplary embodiment can notify the user of the accumulation amount of the encryption key.

Second Embodiment

Next, the second embodiment will be described.

Figure 9:
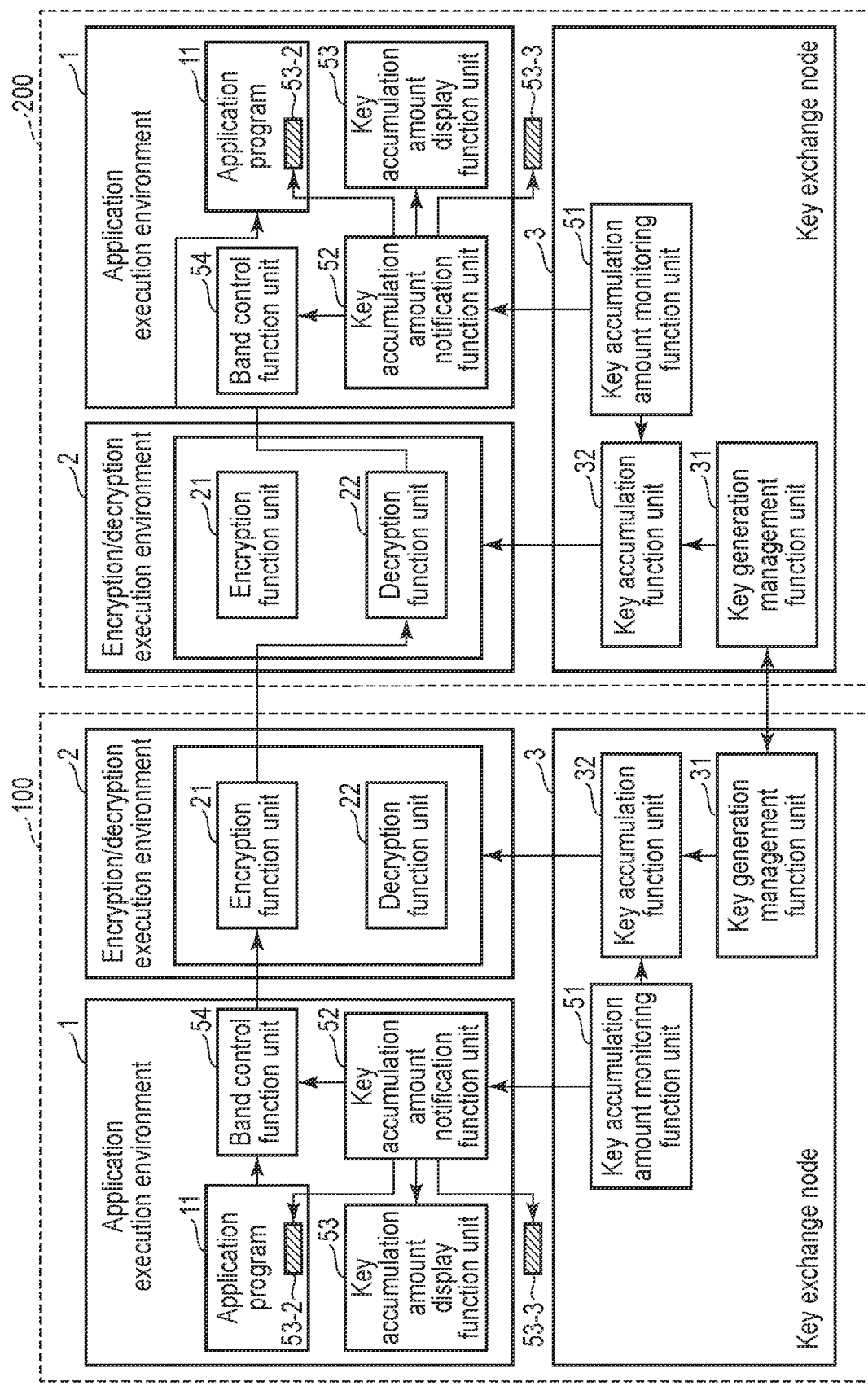
FIG. 9 is a diagram illustrating an example of configuration of a cryptography communication system according to the second embodiment.

FIG. 9 is a diagram illustrating an example of a configuration of a cryptography communication system according to the second embodiment.

In the cryptography communication system according to the present embodiment, an application execution environment 1 further includes a band control function unit 54.

A key accumulation amount notification function unit 52 of the application execution environment 1 in the cryptography communication system according to the present embodiment notifies the band control function unit 54 in addition to a key accumulation amount display function unit 53 of the accumulation amount, of the encryption key of a key accumulation function unit 32 of a key exchange node 3, notified from a key accumulation amount monitoring function unit 51 of the key exchange node 3.

The band control function unit 54 is interposed between an application program 11 operating in the application execution environment 1 and an encryption function unit 21 of an encryption/decryption execution environment 2, and controls the consumption amount of the encryption key by the application program 11 based on the accumulation amount of the encryption key, notified from the key accumulation amount notification function unit 52. Specifically, the amount of transmission data of the application program 11 relayed to the encryption function unit 21 is restricted. That is, a communication band available for transmission data of the application program 11 is controlled.

For example, in a case where it is estimated that the encryption key will be depleted within a predetermined time when the accumulation amount of the encryption key decreases at the current pace, the band control function unit 54 executes control for taking measures such as giving priority to communication contents (transmission source, destination, protocol, etc.) as described in the first embodiment. For example, the band control function unit 54 gives priority to transmission of data such as the application program 11 for an online conference, which is required to be transferred in real time, such as video and audio of the online conference, over transmission of data such as the application program 11 for e-mail, which allowed to be delayed to some extent, such as an e-mail.

The band control function unit 54 can set a condition for restricting the communication band and the restriction content by, for example, parameter input at the time of activation. Alternatively, a setting file that can be edited by an editor or the like may be prepared.

In the cryptography communication system according to the present embodiment, since the accumulation amount of the encryption key to the user by the key accumulation amount display function unit 53 is displayed, when the restriction of the communication band is executed by the band control function unit 54, it is possible to recognize that the cause is the accumulation amount of the encryption key.

As described above, in the cryptography communication system according to the present embodiment, in addition to being able to notify the user of the accumulation amount of the encryption key, in the first embodiment, the band control function unit 54 that receives notification of the accumulation amount of the encryption key from the key accumulation amount notification function unit 52 can automatically perform some or all of the various countermeasures performed by the user in response to presentation of the accumulation amount of the encryption key.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryptography communication system comprising:
one or more information processing devices, each of the one or more information processing devices comprising a hardware processor;
an application execution environment in which application programs which transmit and receive data via a network operate;
an encryption/decryption execution environment which encrypts transmission data of the application programs and decrypts encrypted reception data of the application programs while consuming an encryption key for each predetermined processing function; and
a key exchange node which generates the encryption key, shares the generated encryption key with a communication counterpart, and accumulates an encryption key shared with the communication counterpart,
wherein:
the key exchange node comprises a key accumulation amount monitoring function which monitors an accumulation amount of the encryption key,
the application execution environment being programmed to perform:
a key accumulation amount notification function which notifies a user of the application programs or the application programs of an accumulation amount of the encryption key acquired by the key accumulation amount monitoring function, and
a band control function which controls communication bands available for transmission data of the application programs based on priorities set for each communication of the application programs and the accumulation amount of the encryption key acquired by the key accumulation amount monitoring function, and
the application execution environment, the encryption/decryption execution environment, and the key exchange node are each constructed on at least one of the one or more information processing devices.

2. The cryptography communication system of claim 1, wherein the key accumulation amount notification function graphically represents a usage rate of an accumulation amount of the encryption key or graphically represents a temporal transition of the accumulation amount of the encryption key.

3. An application execution environment in which application programs which transmit and receive data via a network operate, the application execution environment being constructed on at least one processing device comprising a hardware processor, the application execution environment comprising:
a key accumulation amount notification function which generates an encryption key consumed for each predetermined processing function in encrypting transmission data of the application programs, shares the generated encryption key with a communication counterpart, acquires an accumulation amount of the encryption key from a key exchange node which accumulates the encryption key shared with the communication counterpart, and notifies the application programs or a user of the application programs of the acquired accumulation amount of the encryption key; and
a band control function which controls communication bands available for transmission data of the application programs based on priorities set for each communication of the application programs and the acquired accumulation amount of the encryption key.

4. A control method of a cryptography communication system comprising an application execution environment in which application programs which transmit and receive data via a network operate, an encryption/decryption execution environment which encrypts transmission data of the application programs and decrypts encrypted reception data of the application programs while consuming an encryption key for each predetermined processing function, and a key exchange node which generates the encryption key, shares the generated encryption key with a communication counterpart, and accumulates an encryption key shared with the communication counterpart, the method comprising:
monitoring, by the key exchange node, an accumulation amount of the encryption key;
notifying, by the application execution environment, the application programs or a user of the application programs of an accumulation amount of the encryption key acquired by the monitoring; and
controlling, by the application execution environment, communication bands available for transmission data of the application programs based on priorities set for each communication of the application programs and the accumulation amount of the encryption key acquired by the monitoring.

5. The control method of claim 4, wherein the notifying includes graphically representing a usage rate of an accumulation amount of the encryption key or graphically representing temporal transition of the accumulation amount of the encryption key.

6. A control method of an application execution environment in which application programs which transmit and receive data via a network operate, the method comprising:
generating an encryption key consumed for each predetermined processing function in encrypting transmission data of the application programs, sharing the generated encryption key with a communication counterpart, acquiring an accumulation amount of the encryption key from a key exchange node which accumulates the encryption key shared with the communication counterpart, and notifying a user of the application programs or the application programs of the acquired accumulation amount of the encryption key; and
controlling communication bands available for transmission data of the application programs based on priorities set for each communication of the application programs and the acquired accumulation amount of the encryption key.

7. A non-transitory computer-readable storage medium having stored thereon a computer program which is executable by a cryptography communication system comprising an application execution environment in which application programs which transmit and receive data via a network operate, an encryption/decryption execution environment which encrypts transmission data of the application programs and decrypts encrypted reception data of the application programs while consuming an encryption key for each predetermined processing function, and a key exchange node which generates the encryption key, shares the generated encryption key with a communication counterpart, and accumulates an encryption key shared with the communication counterpart,
the computer program controlling the key exchange node to execute function of monitoring an accumulation amount of the encryption key, the computer program controlling the application execution environment to execute function of notifying a user of the application programs or the application programs of an accumulation amount of the encryption key acquired by the monitoring, and p1 the program controlling the application execution environment to execute function of controlling communication bands available for transmission data of the application programs based on priorities set for each communication of the application programs and the accumulation amount of the encryption key acquired by the monitoring.

8. The medium of claim 7, wherein the notifying by the application execution environment includes graphically representing a usage rate of an accumulation amount of the encryption key or graphically representing temporal transition of the accumulation amount of the encryption key.

9. A non-transitory computer-readable storage medium having stored thereon a computer program which is executable by an application execution environment in which application programs which transmit and receive data via a network operate, to execute function of:

generating an encryption key consumed for each predetermined processing function in encrypting transmission data of the application programs, share the generated encryption key with a communication counterpart, acquire an accumulation amount of the encryption key from a key exchange node which accumulates the encryption key shared with the communication counterpart, and notifying a user of the application programs or the application programs of the acquired accumulation amount of the encryption key, and controlling a communication band available for transmission data of the application programs based on priorities set for each communication of the application programs and the acquired accumulation amount of the encryption key.

10. The cryptography communication system of claim 1, wherein the application execution environment is constructed on one of the one or more information processing devices; and the encryption/decryption execution environment is constructed on a different one of the one or more information processing devices.

11. The cryptography communication system of claim 1, wherein the application execution environment is constructed on one of the one or more information processing devices; and the key exchange node is constructed on a different one of the one or more information processing devices.

12. The cryptography communication system of claim 1, wherein the application execution environment is constructed on one of the one or more information processing devices; and the encryption/decryption execution environment and the key exchange node are constructed on a different one of the one or more information processing devices.

13. The cryptography communication system of claim 1, wherein the application execution environment, the encryption/decryption execution environment, and the key exchange node are each constructed on different ones of the one or more information processing devices.

* * * * *